United States Patent
Pandey et al.

(10) Patent No.: US 10,836,896 B2
(45) Date of Patent: *Nov. 17, 2020

(54) COMPOSITIONS COMPRISING POLYACRYLATE-POLYSILANE BLOCK COPOLYMERS

(71) Applicant: CLARIANT PLASTICS & COATINGS LTD, Muttenz (CH)

(72) Inventors: Someshwarnath Dinanath Pandey, Thane (IN); Achintya Kumar Sen, Thane (IN); Vinesh Ramesh Adep, Thakurli East (IN)

(73) Assignee: Clariant Plastics & Coatings Ltd, Muttenz (CH)

(*) Notice: Subject to any disclaimer, the term of this patent is extended or adjusted under 35 U.S.C. 154(b) by 5 days.

This patent is subject to a terminal disclaimer.

(21) Appl. No.: 16/320,607

(22) PCT Filed: Jul. 17, 2017

(86) PCT No.: PCT/EP2017/068049
§ 371 (c)(1),
(2) Date: Jan. 25, 2019

(87) PCT Pub. No.: WO2018/019643
PCT Pub. Date: Feb. 1, 2018

(65) Prior Publication Data
US 2019/0161583 A1 May 30, 2019

(30) Foreign Application Priority Data
Jul. 27, 2016 (EP) .................................... 16181392

(51) Int. Cl.
| | |
|---|---|
| C08L 43/04 | (2006.01) |
| C08F 230/08 | (2006.01) |
| C08G 81/02 | (2006.01) |
| C08G 77/442 | (2006.01) |
| C08F 299/08 | (2006.01) |
| C08F 8/42 | (2006.01) |
| C08G 77/42 | (2006.01) |
| C08L 23/12 | (2006.01) |
| C08L 25/06 | (2006.01) |
| C08L 67/02 | (2006.01) |
| C08L 33/14 | (2006.01) |
| C08L 53/00 | (2006.01) |
| C08L 33/08 | (2006.01) |

(52) U.S. Cl.
CPC .............. *C08L 43/04* (2013.01); *C08F 8/42* (2013.01); *C08F 230/08* (2013.01); *C08F 299/08* (2013.01); *C08G 77/42* (2013.01); *C08G 77/442* (2013.01); *C08G 81/024* (2013.01); *C08L 23/12* (2013.01); *C08L 25/06* (2013.01); *C08L 67/02* (2013.01); *C08L 33/08* (2013.01); *C08L 33/14* (2013.01); *C08L 53/00* (2013.01); *C08L 2205/03* (2013.01)

(58) Field of Classification Search
CPC ........ C08F 8/42; C08F 230/08; C08F 293/00; C08F 295/00
See application file for complete search history.

(56) References Cited

U.S. PATENT DOCUMENTS

2006/0210929 A1* 9/2006 Yamada ................ G03F 7/0758
430/311

OTHER PUBLICATIONS

"Block Copolymers of y-Methacryloxypropyltrimethoxysilane and Methyl Methacrylate by RAFT Polymerization. A New Class of Polymeric Precursors for the Sol Gel Process." authored by Mellon et al. and published in Macromolecules (2005) 38, 1591-1598.*
Machine translation of JP 01-004640 (no date).*

* cited by examiner

Primary Examiner — Marc S Zimmer
(74) Attorney, Agent, or Firm — Morgan, Lewis & Bockius LLP

(57) ABSTRACT

The present invention provide a composition comprising: a polyacrylate-polysilane block copolymer of structure (I) and an organic polymer which is different from the block copolymer of formula (I) wherein m and n independent of one another, are integers ranging from 2 to 4000; p is an integer ranging from 0 to 5; q is an integer ranging from 1 to 5; $R_1$ represents hydrogen, straight-chain or branched alkyl group having 1 to 4 carbon atoms; $R_2$ represents hydrogen, straight-chain or branched alkyl group having 1 to 18 carbon atoms; $R_3$ represents hydrogen, hydroxyl group, straight-chain or branched alkyl group having 1 to 4 carbon atoms, or an $C_6$-$C_{14}$-aryl group; L is a single bond or a bivalent group —NH—, —C(O)NH—, —NHC(O)NH—, —OC(O)NH— or —CH$_2$—; $R^4$, $R^5$ and $R^6$ independent of one another, represent hydrogen, straight-chain or branched alkyl group having 1 to 8 carbon atoms or a polydimethylsiloxane residue; and $R^7$ represents hydrogen or methyl group.

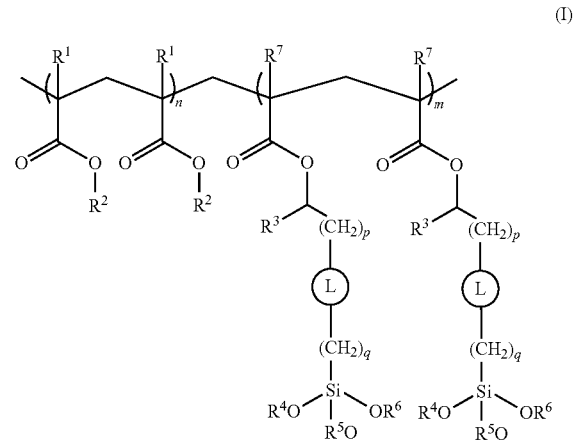

(I)

14 Claims, No Drawings

COMPOSITIONS COMPRISING POLYACRYLATE-POLYSILANE BLOCK COPOLYMERS

BACKGROUND

Field of the Invention

The invention relates to compositions comprising polyacrylate-polysilane block copolymers. The invention also relates to articles prepared from the compositions.

Description of the Related Art

Plastics or polymers are so widely used that they have replaced conventional materials such as glass or metals in many of their applications. For example, in automotive industry the drive to decrease the overall weight of the vehicle has resulted in replacement of some of the metal parts with polymers such as polypropylene (PP). However, polymers, in particular PP, exhibit poor performance for applications requiring good aesthetics, such as surface appearance or resistance to scratch.

U.S. Pat. No. 6,048,942 discloses thermoplastic olefin compositions comprising mar resistance additives selected from polysiloxanes, metal stearates, saturated fatty acid amides and unsaturated fatty acid amides.

JP 2002338778 teaches a graft copolymer composition comprising fatty acid amides.

U.S. Pat. No. 5,731,376 discloses polypropylene block copolymer with improved scratch resistance by inclusion of a polyorganosiloxane. The composition may further include a fatty acid amide.

U.S. Pat. No. 5,585,420 teaches scratch resistant polyolefin compositions comprising a plate like inorganic filler. The compositions may further comprise high rubber ethylene-propylene copolymers, fatty acid amides, polyorganosiloxanes or epoxy resins.

JP 2002003692 discloses polypropylene resin comprising fatty acid amides.

JP 62072739 is aimed at molded articles for automobile parts made by compounding a specific polyolefin with a rubbery substance and a specific amount of mica of a specific particle size. The polyolefin consists of a certain polypropylene and a polyolefin modified with an unsaturated carboxylic acid (anhydride), for example maleic anhydride.

JP 2001261902 is aimed at polypropylene resin compositions comprising surface-treated talc and at least one additive selected from fatty acid amides and glycerol fatty acid monoesters.

U.S. 2003/0004245 A teaches blends of polyolefin and a reaction product of polyolefin and an alpha, beta unsaturated carboxylic ester, acid or anhydride.

WO A-2011/083044 discloses improving scratch resistance by reacting the polyolefin with a polyorganosiloxane in the presence of means capable of generating free radical sites in the polyolefin.

WO2015132190A1 discloses a process for increasing scratch resistance of a polymer composition by reactively mixing a thermoplastic organic polymer and an organopolysiloxane to form a masterbatch and blending the masterbatch with the polymer.

The prior art solutions may suffer from one or the other drawbacks. For example, polymer compositions incorporating filler material or inorganic particles, though they may offer enhanced surface properties, can be detrimental to other desired polymer properties such as impact strength. Moreover, uniform dispersion of these particles is difficult to achieve resulting in non-uniform surface properties in products made thereof. Surface hardness can be enhanced by incorporating resins having harder surface character than bulk polymer, however they are often not found on the surface of the articles formed from these polymer compositions thus reducing their efficacy. Certain additives for improving the surface property of the polymer are known to leach out over time as they are not compatible with the bulk of the polymer. Thus, it remains desirable to provide solutions that may enhance surface appearance of a polymer, in particular, its resistance to scratch.

SUMMARY

The present invention provides a composition comprising a polyacrylate-polysilane block copolymer of formula (I) and an organic polymer which is different from the block copolymer of formula (I),

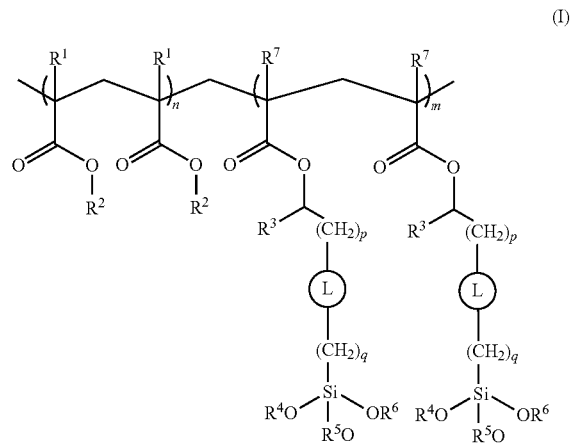

wherein m and n independent of one another, are integers ranging from 2 to 4000;

p is an integer ranging from 0 to 5;

q is an integer ranging from 1 to 5;

$R^1$ represents hydrogen, straight-chain or branched alkyl group having 1 to 4 carbon atoms;

$R^2$ represents hydrogen, straight-chain or branched alkyl group having 1 to 18 carbon atoms;

$R^3$ represents hydrogen, hydroxyl group, straight-chain or branched alkyl group having 1 to 4 carbon atoms, or an $C_6$-$C_{14}$-aryl group;

L is a single bond or bivalent group —NH—, —C(O)NH—, —NHC(O)NH—, —OC(O)NH— or —CH$_2$—;

$R^4$, $R^5$ and $R^6$ independent of one another, represent hydrogen, straight-chain or branched alkyl group having 1 to 8 carbon atoms or a polydimethylsiloxane residue; and $R^7$ represents hydrogen or methyl group.

As used herein, "n" represents the degree of polymerization of the polyacrylate block (A) of the polyacrylate-polysilane block copolymer of formula (I). In a preferred embodiment, n is in a range of from 10 to 3000, more preferably from 50 to 2500, most preferably from 100 to 1000.

As used herein "m" represents the degree of polymerization of the polysilane block (B) of the polyacrylate-polysilane block copolymer of formula (I). In a preferred embodiment, m is in a range of 10 to 3000, more preferably from 50 to 2500, most preferably from 100 to 1000.

Preferred $R^1$ groups include hydrogen, methyl, ethyl, propyl, isopropyl, butyl, iso-butyl, more preferred are hydrogen, methyl and ethyl.

Preferred $R^2$ groups include hydrogen, methyl, ethyl, propyl, isopropyl, butyl, iso-butyl, more preferred are hydrogen, methyl and ethyl. In one particularly preferred embodiment, $R^1$ is hydrogen and $R^2$ is hydrogen. In another particularly preferred embodiment, $R^1$ is methyl and $R^2$ is hydrogen.

Preferably, p is an integer ranging from 0 to 3, more preferably p is 0 or 1, most preferred p is 0.

Preferably, q is an integer ranging from 1 to 3, more preferably q is 1 or 2, most preferably q is 1. In a particularly preferred embodiment, p is 1 and q is 1.

In another particularly preferred embodiment, m is in a range of 100 to 2200, preferably 100 to 1000, n is in a range of 100 to 2200, preferably 100 to 1000, p is in a range of 0 to 3 and q is in a range of 1 to 3.

Preferably, $R^3$ represents hydrogen, straight-chain or branched alkyl group having 1 to 4 carbon atoms, or a $C_6$-$C_{10}$-aryl group, e.g phenyl or naphthyl. Most preferred, $R^3$ is hydrogen.

Preferably, L represents a —$CH_2$— group.

Preferably, $R^4$, $R^5$ and $R^6$ are hydrogen, straight-chain or branched alkyl group having 1 to 6 carbon atoms or a polydimethylsiloxane residue.

Preferably, $R^7$ is methyl group.

Preferably, $R^3$ represents hydrogen, $R^4$, $R^5$ and $R^6$ independently, represents at least one polydimethylsiloxane group and $R^7$ represents methyl group.

Preferably, L represents methylene (—$CH_2$—) group and $R^4$, $R^5$ and $R^6$, independent of one another, represents at least one polydimethyl siloxane group.

Preferably, L represents amine (—NH—) group, amide (—C(O)NH—) group, urea (—NHC(O)NH—) group, or urethane (—OC(O)NH—) group and $R^4$, $R^5$ and $R^6$, independent of one another, represents at least one polydimethyl siloxane group.

In a particularly preferred embodiment at least one of the groups $R^4$, $R^5$ and $R^6$ represent a polydimethylsiloxane residue.

Polydimethylsiloxane (PDMS) has the formula (II)

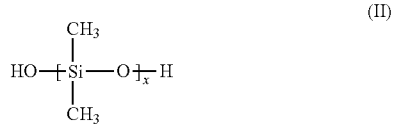

(II)

wherein x ranges from 6.5 to 4054 such that a number average molecular weight in a range of about 500 g/mole to about 300,000 g/mole results.

In a preferred embodiment, the number average molecular weight of PDMS is from 500 g/mole to 20,000 g/mole.

Preferably, the weight ratio of PDMS to the total weight of polyacrylate-polysilane block copolymer of formula (I) is in a range of 1:2.8 to 1:24023.

The number average molecular weight of polyacrylate block A is preferably in a range of 400 g/mole to 3.04 million g/mole, more preferably of 10,000 to 220,000 g/mole.

The number average molecular weight of polysilane block B is preferably in a range of 490 g/mole to 7,204 million g/mole, more preferably of 24,500 to 539,000 g/mole.

Expediently, the weight ratio of the polyacrylate block A to the polysilane block B in preparing the polyacrylate-polysilane block copolymer of formula (I) is in a range of $1:1.8\times10^7$ to 6204:1. The polyacrylate-polysilane block copolymer has a number average molecular weight in a range of about 890 g/mole to about 7,207 million g/mole.

Examples of organic polymers include polyolefins, polyoxides, polyesters, polystyrene, polylactic acid, cellulose, acrylonitrile-butadiene-styrene (ABS), polyamide, polycarbonate, alkyd resins, polyester resins, amino resins, phenol resins, polyurethane resins, epoxy resins, melamine-urethane-formaldehyde resins, urethane-formaldehyde resins, melamine resins and acrylate resins their homopolymers and copolymers thereof.

Examples of polyolefins include polyisobutylene, polybut-1-ene, poly-4-methylpent-1-ene, polyisoprene, polybutadiene, polypropylene (PP), polyethylene (PE), high density polyethylene (HDPE), linear low density polyethylene (LLDPE), polypropylene random and impact (heterophasic) copolymers and copolymers thereof. Preferred polyolefins of the present invention include polypropylenes, especially homopolymers, polypropylene impact (heterophasic) copolymers, and blends thereof.

Preferably, the block copolymers of general formula (I) are present in the composition in an amount of from 0.5 to 90% by weight of the total weight of the composition. In one embodiment, the block copolymers of general formula (I) are present in the organic polymer in an amount of from 0.5 to 10% by weight of the total weight of the composition. In yet another embodiment, especially in the case of a masterbatch, the block copolymers of general formula (I) are present in the organic polymer in an amount of from 5 to 90% by weight, preferably 10 to 80% by weight of the total weight of the composition.

The block copolymers of general formula (I) are incorporated into the organic polymers by processes known to one skilled in the art, for example directly as pellets, powder, or micropowder in the solid form, or as a melt. When added as a solid, the block copolymers of the formula (I) in finely divided form are particularly suitable. In another embodiment, the block copolymer is dissolved in a solvent to form a solution prior to incorporating in the polymer. The solution can comprise a concentration of 5 -80% by weight of the block copolymer.

The incorporation may take place in a combined step of the process, or else in separate steps. In one embodiment, the block copolymers are incorporated into the organic polymer as a masterbatch. Masterbatches, by which is meant concentrated preparations of additives which may be added to polymeric materials prior to the production of articles therefrom to give a desired effect in the mass to the articles, are well known to and widely used by the plastics industry. The masterbatch may additionally comprise other additives such as hereinafter mentioned.

The composition of the invention can further include one or more of other additives to improve or enhance the function or processing. Non-limiting examples of additives include UV absorbers, light stabilizers based on sterically hindered amines, flame retardants, quenchers, antioxidants, pigments, acid scavengers, fillers, ignition resistant additives, antioxidants, photostablizers, coloring substances, antistatic agents, dispersing agents, mold-release agents, copper inhibitors, nucleating agents, plasticizers, lubricants, emulsifiers, optical brighteners, rheology additives, catalysts, flow-control agents, slip agents, crosslinking agents, crosslinking boosters, halogen scavengers, smoke inhibitors, clarifiers or blowing agents. If used, such additives may be present in an amount ranging from about 0.01 to about 25% by weight, preferably from about 0.1 to about 20% by weight, more preferably from about 1 to about 15% by weight, more preferably from about 2 to about 12% by weight, and most preferably from about 5 to about 10% by weight, based on the total weight of the polymer composition.

The inventive composition comprising the block copolymer having polyacrylate-polysilane block copolymer backbone and optionally pendant PDMS groups can improve the surface properties of an article formed from the composition, in particular the resistance to scratch. It is believed that the presence of the polyacrylate block in the polyacrylate-polysilane block copolymer makes it compatible with many of the commercially available polymers when incorporated into it. Further, it is believed that the pendant PDMS group on the polysilane block of the block copolymer migrates to the surface thus enhancing the surface property while the backbone remains firmly in the bulk thus preventing leaching out of the inventive block copolymer over time. As will be appreciated, inventors by careful selection of the copolymer architecture has designed a novel additive which while remaining in the bulk enhances the surface property of the resulting polymer.

The composition comprising the block copolymers can be made into an article. The article can be a molded article or an extruded article to take any shape or form. As a molding method, the conventional method such as extrusion molding, injection molding, blow molding, calender molding, and compression molding is employed to obtain a molded product having a desired shape. Molded article include moldings, rotomolded articles, injection molded articles, blow molded articles and the like. In an extrusion process, the composition is melt mixed. For melt mixing, a single-screw extruder, twin-screw extruder, kneader, Banbury mixer or the like may be used. Although the mixing conditions are not particularly limited, the composition is preferably mixed at a temperature of 120 to 250° C. The mixed composition is pelletized in a desired shape such as cylinder, prism, sphere and the like.

The composition and the resulting article finds a wide variety of applications. For example, articles include exterior and interior automotive parts, for example, bumper beams, bumper fascia, pillars, instrument panels and the like; in electrical and electrical equipment device housings and covers; as well as other household and personal articles, including, for example, appliance housings, housewares, beverage bottles, freezer containers, and crates; lawn and garden furniture; and building and construction sheet. In a specific embodiment, the composition is molded into parts that may be used in the interior of an automobile, such as a console, steering column cover, driver lower cover, column cover lower, column cover upper, side cover right, side cover left, center lower cover, center lower garnish, defroster duct, glove box, duct outlet and tailgate lower.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, the examples are not intended to limit the invention, as defined in the appended claims, in any manner.

EXAMPLES

Example 1 a) Synthesis of Silane Polymer:

A three-necked round bottom (RB) flask was attached with a condenser and a Schlenk line for purging with nitrogen. The RB flask was placed over a stirrer and a hot plate with heat on block. Nitrogen gas was flushed through preheated and dried RB flask to remove any moisture content prior to polymerization.

About 10 grams of methacryloxypropyltrimethoxysilane was taken in the RB flask and temperature was raised to 63° C. Azobisisobutyronitrile (AIBN) (0.04 g) was added drop-wise into the RB flask. The onset of the reaction is marked with increase in viscosity of the reaction mixture. The heating and stirring was continued for another 2 hours. The reaction mixture was cooled down.

b) Synthesis of Acrylate Polymer

About 40 grams methyl methacrylate (MMA) along with 100 millilitres (mL) of tetrahydrofuran (THF) was taken in a three-necked RB flask which has been purged with nitrogen. The temperature of the reaction mixture was raised to 60° C. Nitrogen atmosphere was maintained through the Schlenk line. After the temperature was attained, 0.16 g of azobisisobutyronitrile (AIBN) was added to the reaction mixture. The onset of the reaction is marked by solids formation. The reaction was continued for 1 hour. A sample was withdrawn from the reaction mixture after 1 hour for further characterization. The acrylate polymer obtained from this Example was characterized using NMR. The NMR data 1H NMR (400 MHz, CDCl3) δ 3.7-3.5 [COOCH3], δ 2.0 1.5 [C(CH3)CH2], δ 1.5-0.5 [C(CH3)CH2] confirms the formation of the polymer. The molecular weight analysis was performed in chloroform solvent using GPC with polystyrene standards and is listed in Table 1. The acrylate polymer has a weight average molecular weight (Mw) of 209,000, a number average molecular weight (Mn) of 73,000 g/mole and a polydispersity of 2.8.

c) Synthesis of Block Copolymer:

About 1.6 g of reaction mixture containing silane polymer of Example 1a was taken under inert atmosphere and added to the flask of Example 1 b. The reaction was continued for further 1 hour and then about 10 g of polydimethylsiloxane (PDMS Mn 500 g/mole) was added to the RB flask along with 0.2 g of dibutyltin dilaurate (DBTDL). The reaction was continued for further 2 hours and precipitated out in excess methanol. The resulting product was then filtered and dried in vacuum oven at 40° C. for 24 hours to remove traces of methanol from the product. The block copolymer product thus obtained was then weighed to get a yield of 89% and used for further characterisation. The block copolymer formation is confirmed by NMR from the appearance of peak at δ 0.3-0.0 corresponding to [Si—CH$_3$]. The molecular weight analysis of block copolymer was performed in chloroform solvent using GPC with polystyrene standards and is listed in Table 1. The block copolymer has a weight average molecular weight (Mw) of 240,000, a number average molecular weight (Mn) of 105,000 and a polydispersity of 2.3 as shown in Table 1.

TABLE 1

GPC data of acrylate and block copolymers

| Example | Mw (g/mole) | Mn (g/mole) | Polydispersity |
|---|---|---|---|
| 1b | 209,000 | 73,000 | 2.8 |
| 1c | 240,000 | 105,000 | 2.3 |

Tg of the polymer was recorded using DSC (Perkin Elmer DSC 6000) at a heating rate of 10° C/min. The block copolymer exhibits two Tg, the first Tg corresponding to PDMS appear at around 50° C. to 70° C. and the second Tg corresponding to acrylate appear between 140° C. and 150° C.

The TGA (Thermogravimetric Analysis) of the block copolymer was measured using Perkin Elmer TGA 4000 to know the degradation temperature. A sample of the block copolymer was heated under nitrogen atmosphere and the heating was continued to a temperature of up to 700° C. at the rate of 20° C. per minute. The TGA of the block copolymer shows onset of degradation at a temperature of 250° C. which indicates the suitability of these block polymers in conventional polymer processing methods.

Example 2

Preparation of polypropylene compositions: The polyacrylate-polysilane block copolymer (PPBC) of Example 1c was blended with polypropylenes (PP) to form compositions 2a-2d as shown in Table 2. The polypropylenes, polypropylene copolymer (Repol MI3530) and polypropylene homopolymer were procured from Reliance Industries Limited (RIL). The compositions were twin screw extruded using a twin screw extruder (Swastik, India) to form granules. The granules were injection moulded using an injection moulding machine (Arburg, Germany) to form sample moulded sheets (2a-2d) with dimensions of 4.5×8.5×0.2 centimeter (cm) having textured surface on one side. Similarly, blank moulded sheets were also prepared without adding polyacrylate-polysilane block copolymer to polypropylene for comparison.

Example 3

Preparation of polystyrene compositions: The polyacrylate-polysilane block copolymer (PPBC) of Example 1c with varying weight percent was mixed with polystyrene (PS) granules (GPPS SC 206, RIL) to form compositions 3a-3c as shown in Table 3. The compositions were injection moulded using an injection moulding machine (Arburg) to form sample moulded sheets (3a-3c) with dimensions of 4.5×8.5×0.2 cm having textured surface on one side. Similarly, a blank moulded sheet was also prepared without adding polyacrylate-polysilane block copolymer to PS for comparison.

Example 4

Preparation of Polyethylene terephthalate (PET) compositions: The polyacrylate-polysilane block copolymer (PPBC) of Example 1c with varying weight percent was mixed with PET granules (Relpet, RIL) to form compositions 4a-4b as shown in Table 4. The compositions were injection moulded using an injection moulding machine (Arburg) to form sample moulded sheets (4a-4b) with dimensions of 4.5×8.5×0.2 cm having textured surface on one side. Similarly, a blank moulded sheet was also prepared without adding polyacrylate-polysilane block copolymer to PET for comparison.

Example 5

Scratch resistance test (ASTM D3363-00): The moulded sheets of Examples 2 to 4 were evaluated for scratch resistance using pencils of hardness 3H and 4H, respectively. The blank sheets as well as sample sheets were scratched and the resulting scratches on the surfaces were evaluated visually as well as by using an Optical microscope (Olympus BX-51). The width and impression of the scratches on the surfaces were compared and accordingly rated as having passed (P) or failed (F) the tests and for which the data was not available is marked as N.A. The results of the tests are given along with the compositions in Tables 2, 3 and 4. The minimum industry requirement for scratch resistance is to have passed a 3H pencil scratch resistance test. The scratch resistance tests confirm the utility of the polyacrylate-polysilane block copolymer as scratch resistance additive for polymers.

TABLE 2

Polypropylene compositions

| Sample no. | PPBC (weight percent) | PP copolymer (weight percent) | PP homopolymer (weight percent) | 3H | 4H |
|---|---|---|---|---|---|
| 2a | 1 | 96 | 3 | P | P |
| 2b | 2 | 95 | 3 | P | P |
| 2c | 1 | 99 | 0 | P | F |
| 2d | 2 | 98 | 0 | P | P |

TABLE 3

Polystyrene compositions

| Sample no. | PPBC (weight percent) | PS (weight percent) | 3H | 4H |
|---|---|---|---|---|
| 3a | 0.5 | 99.5 | P | F |
| 3b | 1 | 99 | P | P |
| 3c | 2 | 98 | P | P |

TABLE 4

PET compositions

| Sample no. | PPBC (weight percent) | PET (weight percent) | 3H | 4H |
|---|---|---|---|---|
| 4a | 1 | 99 | N.A | P |
| 4b | 2 | 98 | P | P |

The invention claimed is:

1. A composition comprising:

a polyacrylate-polysilane block copolymer of structure (I) and an organic polymer which is different from the block copolymer of formula (I):

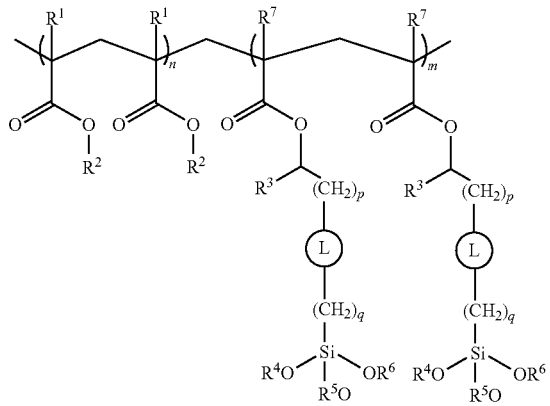

(I)

wherein m and n independent of one another, are integers ranging from 2 to 4000;

p is an integer ranging from 0 to 5;

q is an integer ranging from 1 to 5;

$R^1$ represents hydrogen, straight-chain or branched alkyl group having 1 to 4 carbon atoms;

$R^2$ represents hydrogen, straight-chain or branched alkyl group having 1 to 18 carbon atoms;

$R^3$ represents hydrogen, hydroxyl group, straight-chain or branched alkyl group having 1 to 4 carbon atoms, or an $C_6$-$C_{14}$-aryl group;

L is a single bond or a bivalent group —NH—, —C(O)NH—, —NHC(O)NH—, —OC(O)NH— or —CH$_2$—;

$R^4$, $R^5$ and $R^6$ independent of one another, represent hydrogen, straight-chain or branched alkyl group having 1 to 8 carbon atoms or a polydimethylsiloxane residue; and $R^7$ represents hydrogen or methyl group.

2. The composition of claim 1, wherein at least one of $R^4$, $R^5$ and $R^6$ represents a polydimethylsiloxane group.

3. The composition of claim 1, wherein $R^3$ represents hydrogen, $R^7$ represents methyl group and wherein at least one of $R^4$, $R^5$ and $R^6$ represents a polydimethylsiloxane group.

4. The composition of claim 1, wherein L represents methylene (—CH$_2$—) group and wherein at least one of $R^4$, $R^5$ and $R^6$ represents a polydimethylsiloxane group.

5. The composition of claim 1, wherein L represents amine (—NH—) group, amide (—C(O)NH—) group, urea (—NHC(O)NH—) group, or urethane (—OC(O)NH—) group and wherein at least one of $R^4$, $R^5$ and $R^6$ represents a polydimethylsiloxane group.

6. The composition as claimed in claim 1, wherein m is an integer ranging from 100 to 1000; n is an integer ranging from 100 to 1000, p is an integer ranging from 0 to 3 and q is an integer ranging from 1 to 3.

7. The composition as claimed in claim 1, wherein the weight ratio of the polyacrylate block (A) to the polysilane block (B) is in the range of about 1:1.8×10$^7$ to 6204:1.

8. The composition as claimed in claim 1, wherein the number average molecular weight of the polydimethylsiloxane group is in the range of about 500 g/mole to about 300,000 g/mole.

9. The composition as claimed in claim 1, wherein the organic polymer comprises at least one of polyolefins, polyoxides, polyesters, polystyrene, polylactic acid, cellulose, acrylonitrile-butadiene- styrene (ABS), polyamide, polycarbonate, alkyd resins, amino resins, phenol resins, polyurethane resins, epoxy resins, melamine-urethane-formaldehyde resins, urethane-formaldehyde resins, melamine resins and acrylate resins.

10. The composition of claim 9, wherein the organic polymer is a polypropylene.

11. The composition as claimed in claim 1, wherein the polyacrylate-polysilane block copolymer is present in the composition in an amount of from about 0.5 to about 90% by weight of the total weight of the composition.

12. The composition of claim 11, wherein the polyacrylate-polysilane block copolymer is present in the composition in an amount of from about 5% to about 90%.

13. An article prepared from the composition as claimed in claim 1, wherein the article is a molded article or an extruded article.

14. The article of claim 13, wherein the article is an automotive part.

* * * * *